United States Patent Office 3,538,048
Patented Nov. 3, 1970

3,538,048
POLYOLEFINS STABILIZED WITH BENZO-PHENONE ESTERS OF PHOSPHOROUS ACID
George Wright Taylor and Derek Harold Wood, Harrogate, England, assignors to Imperial Chemical Industries Limited, London, England, a corporation of Great Britain
No Drawing. Continuation-in-part of application Ser. No. 539,623, Apr. 4, 1966. This application Mar. 21, 1969, Ser. No. 809,390
Int. Cl. C08f 45/58
U.S. Cl. 260—45.95       8 Claims

ABSTRACT OF THE DISCLOSURE

Stabilized polyolefin compositions incorporating 0.2–2.0% by weight of a phosphorous acid derivative having the structure,

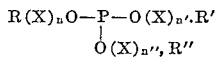

wherein R represents a 2-hydroxybenzophenone radical R' and R" represent a member selected from the class consisting of aryl and alkyl groups having 6–14 carbon atoms, X represents a member selected from the class consisting of alkylene and alkyleneoxy groups having up to 20 carbon atoms and $n$, $n'$ and $n''$ are integers having the value 0–1. Optionally, the compositions also can contain an antioxidant which enhances stabilization by said phosphorous acid derivative.

---

This application is a continuation-in-part of application Ser. No. 539,623, filed April 4, 1966.

This invention relates to new organic phosphorus compounds and to their use in the protection of susceptible organic materials, in particular polyolefines, against such degradative effects as heat and ultra-violet light.

Tri-aryl phosphites containing aromatic hydrocarbon radicals attached to the phosphorus atoms through an oxygen atom are known as plasticisers and as stabilisers against the degradative effects of heat or heat and oxygen.

We have now found that an an improved stabilising effect is obtained, in that susceptible organic materials are protected against degradative influences such as ultra-violet light, heat and oxygen, by the incorporation of organic-phosphorous acid derivatives wherein there is present at least one 2-hydrozybenzophenone group.

According to the present invention we provide stabilised polyolefine compositions incorporating 0.2–2.0% by weight of a phosphorous acid derivative having the structure,

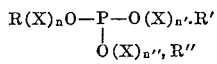

wherein R represents a 2-hydroxybenzophenone radical R' and R" represent a member selected from the class consisting of aryl and alkyl groups having 6–14 carbon atoms, X represents a member selected from the class consisting of alkylene and alkyleneoxy groups having up to 20 carbon atoms and $n$, $n'$ and $n''$ are integers having the value 0–1.

The aryl group or groups (R' and R") may be substituted or unsubstituted mono- or poly-cyclic groups and for the best stabilising effect the R' or R" group as a whole should possess some inherent stabilising effect, as for example, an antioxidant or heat stabilising function. Thus by means of the present invention compositions stabilised against more than one degradative effect may be produced. An example of a particular aromatic group having an inherent stabilising effect is a hindered phenolic group.

The alkyl group or groups (R' and R") contain at least 6 carbon atoms and one function of such a group or groups is to confer upon the organo-phosphorus compound solubility in or compatibility with the polymeric substance. For the best protection of polyolefines by means of the compounds of this invention we prefer to have present in the compound at least one alkyl group (it may be one of the R' or R" groups or a substituent in the benzophenone group or in one of the aryl groups) having at least 12 carbon atoms in either a straight or branched chain.

Likewise the group or groups, X, may be straight, or branched alkylene or alkyleneoxy groups having up to about 20 carbon atoms, the longer chains having some influence on solubility of the compounds in olefine polymers.

Compositions according to the invention may be used in the form of shaped articles of thermoplastic polymers as for example, fibres, filaments, films or mouldings of said polymers.

Poly-α-olefines in particular are susceptible to degradation by influences such as heat, oxygen and UV-light. By means of compounds according to this invention the stability towards one or more of such influences of poly-α-olefines, in particular stereoregular poly-α-olefines, as for example, isotactic polymers of propylene or 4-methyl pentene-1 and linear polyethylene, is greatly enhanced and is frequently appreciably higher than the stability imparted by a mixture of the separate components corresponding to the phosphorous acid derivative. Furthermore if the particular compound used has a sufficiently large molecule and contains appropriate substituents the fastness of the protective agent in the shaped articles to scouring and dry cleaning is high.

For the most effective stabilisation in polymers from olefines containing three or more carbon atoms it is preferred that there is incorporated a phosphorous acid derivative in which at least one of the integers $n$, $n'$ and $n''$ has the value 1. The intervening alkylene or alkyleneoxy group in such compounds appears to significantly enhance the stability of compositions incorporating them.

The protective agent may be incorporated into the polymer by any method, as for example, mixing of the powdered polymer with a solution of the agent in a volatile solvent, followed by drying and granulation of the mixture or by milling the agent directly into the softened polymer in a hot roll or Banbury mixer.

One method of preparing compounds for use in compositions according to the invention is the stepwise introduction of the required groups into a phosphorus trihalide molecule, using reactants having, in addition to the group required, an alcoholic or phenolic hydroxyl substituent which reacts with one or more of the halogen atoms.

The effectiveness of stabilisation of compositions according to this invention in some instances may be enhanced by the addition of other known substances, as for example, thermal stabilisers. This is particularly so when compounds having 2-hydroxybenzophenone substituents as the only active substituents are used. In general 0.2–2.0% by weight of the phosphorous acid derivative imparts adequate stabilisation or if additional stabilising substances are added a total stabiliser content of 0.5–5.0% is adequate.

The examples which follow illustrate the invention and the manner in which it may be performed. In these examples all parts by weight.

EXAMPLE 1

An organo-phosphorous compound possessing a UV-absorbing group, a solubilising group and a partially hindered phenolic group having predominantly the structure

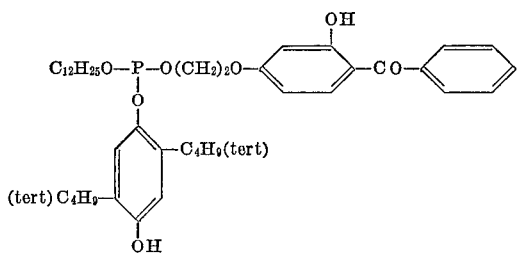

is prepared by reacting together trilauryl phosphite (14.5 parts) and phosphorus trichloride (6.9 parts) at 50° C. with stirring for 1 hour and part of this product (5.7 parts) is added to a suspension of 2-hydroxy-4-(2-hydroxyethoxy) benzophenone (5.2 parts) and 2,5-di-(tert-butyl) hydroquinone (4.4 parts) in benzene (45 parts). Dry nitrogen gas is bubbled through the reaction mixture to facilitate the removal of hydrogen chloride while the solvent is slowly distilled off and the reaction mixture is heated to 200° C. during 2½ hours and maintained at that temperature for a further 20 minutes. After cooling the reaction mixture is washed with diethylether and the insoluble residue, a pale yellow reddish oil, is incorporated into isotactic polypropylene (1% by weight of the polymer) as the sole stabiliser therefor and a portion of the polyolefine mixture is melt spun into filaments at 285° C. The spun filaments are drawn to a ratio of 8:1 and plied with twisting to produce a final yarn having 144, 5 denier filaments and a twist of 5 turns per inch. A further portion of the stabiliser/polyolefine mixture is also hot pressed at 175° C. into a film of 0.005 inch (0.13 mm.) thickness.

The stability of the polypropylene is assessed in two ways (a) by the percentage retention of initial breaking strength of the filamentary yarn after exposure in Weather-O-Meter (Cassella Farbwerke Mainkur A.G.) apparatus for 500 hours and (b) the exposure time required to cause embrittlement of the film when exposed in Xenotest (Atlas Electric Devices Ltd.) apparatus. Results of such exposure are (a) percent strength retained 53 and (b) embrittlement time 920 hours.

By comparison unstabilised polypropylene retains only 25% of its initial yarn strength and it is embrittled in only 110 hours. In a further comparison wherein the multifunctional phosphorous acid derivative is replaced by corresponding proportion of the separate components, namely tributyl phosphite 2,5-di-tertbutylphenol and 2-hydroxy-4-ethoxybenzophenone, inferior stabilisation is obtained.

EXAMPLE 2

An organophosphorus compound having one solubilising group and two UV-absorbing groups, predominantly of the structure

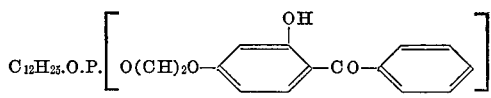

is prepared in the following manner. Part of the intermediate product (5.7 parts) obtained as in Example 1 by reaction of trilauryl phosphite and phosphorus trichloride is added to a suspension of 2-hydroxy-4-(2-hydroxyethoxy)benzophenone (10.3 parts) in dry benzene (50 parts). Dry nitrogen gas is bubbled through the mixture to facilitate the removal of hydrogen chloride while the solvent is slowly distilled off and the reaction mixture is heated during 2 hours to 200° C. at which temperature it is kept for a further 20 minutes. After cooling a thick yellow oil is formed which solidifies on standing. Traces of residual oil are removed by washing the solid with diethyl ether and the product (0.5% by weight of the polymer) is incorporated into isotactic polypropylene together with 0.1% by weight of an antioxidant compound which is the condensation product obtained from 3-methyl-6-tert-butyl phenol and crotonaldehyde.

Strength retention and embrittlement time for yarn and film prepared and exposed as in Example 1 are 66% and 750 hours respectively.

EXAMPLE 3

An organophosphorus compound (0.5% by weight of the polymer) as used in Example 2 is incorporated into stereoregular poly - 4 - methylpentene-1 together with 0.1% by weight of the same antioxidant compound. A film (0.13 mm. thick) prepared from this composition and exposed to the Xenotest apparatus embrittled in 400 hours.

EXAMPLE 4

A low density polyethylene composition containing the same additives as the foregoing Examples 2 and 3 is prepared and from it a film is prepared as in these examples which when exposed in a Xenotest apparatus embrittled in approx. 2000 hours.

EXAMPLE 5

An organophosphorus compound having two solubilising groups and one UV-absorbing group predominantly of the structure

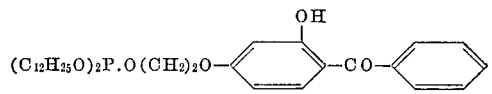

is prepared by shaking together trilauryl phosphite (17.6 parts) and phosphorus trichloride (2.1 parts) at room temperature for 48 hours and part of this product (6.5 parts) is added to a suspension of 2-hydroxy-4-(2-hydroxyethoxy)-benzophenone (3.9 parts) in dry benzene (50 parts) and dry nitrogen gas is bubbled through the mixture while it is heated to 200° C. during 2 hours and maintained at this temperature for a further 20 minutes. The product is incorporated into isotactic polypropylene (1.0% by weight of the polymer) together with 0.1% by weight of an antioxidant compound as used in Example 2.

Strength retention and embrittlement time for yarn and film prepared and exposed as in Example 1 are 67% and 750 hours respectively.

EXAMPLE 6

A film prepared from a composition comprising poly-4-methylpentene-1 and the same amounts of the additives used in Example 5 when exposed in the Xenotest apparatus embrittles in approximately 200 hours.

EXAMPLE 7

An organophosphorus compound possessing one solubilising group, one UV-absorbing group and one hindered phenolic group having predominantly the structure

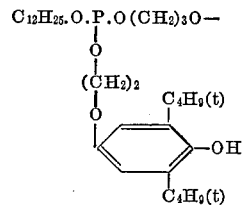

is prepared in the following manner. Part of the intermediate product (4.1 parts) obtained as in Example 1 by reaction of trilauryl phosphite and phosphorus trichloride is added to a suspension of 2-hydroxy-4-(2-hydroxypropoxy) benzophenone (3.9 parts) and 2,6-di-tert-butyl-4-(2-hydroxyethoxy) phenol (3.8 parts) in dry benzene (45 parts). Dry nitrogen gas is bubbled through the mixture to facilitate removal of hydrogen chloride while the solvent is slowly distilled off and the reaction mixture is heated to 150–160° C. and maintained at this temperature for 3½ hours. The product, 0.5% by weight of the polymer, a pale yellow oil, is incorporated into isotactic polypropylene together with a thermal stabiliser, dilauryl thiodipropionate (0.5% by weight of the polymer).

Filamentary yarn prepared from the polypropylene composition as in Example 1 retained 75% of its initial strength when exposed 420 hours in the Xenotest apparatus and required more than 8 hours in an oven at 150° C. to become embrittled (unstabilised polypropylene was embrittled in less than 1 hour under these conditions).

EXAMPLE 8

An organophosphorus compound possessing two UV-absorbing groups and a solubilising group having predominantly the structure.

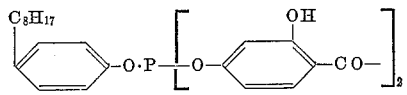

is prepared by reacting together p-octylphenol (20.6 parts) and phosphorus trichloride (36.6 parts) with stirring at 65° C. for 2 hours and part of this product (7.7 parts; di-chloro-p-octylphenol phosphite) is added to a suspension of 2,4-dihydroxybenzophenone (10.7 parts) in benzene (45 parts). Dry nitrogen gas is bubbled through the reaction mixture which is further processed as in Example 1 to produce a reddish-yellow solid 1% by weight of which is incorporated into isotactic polypropylene together with 0.1% of the antioxidant used in Example 2. A film prepared from this mixture when exposed in the Xenotest apparatus embrittles in 540 hours and yarn prepared and exposed as in Example 1 retains 57% of its original strength.

EXAMPLE 9

An analogous organophosphorus compound to that used in the preceding examples having predominantly the structure

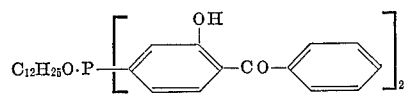

is prepared in the manner of Example 8 using p-laurylphenol (26.2 parts) in place of p-octylphenol. An isotactic polypropylene composition containing 0.5% of the organophosphorus compound and 0.1% of the same antioxidant is used to prepare a film in the same way as in the foregoing examples which film embrittles in 400 hours of Xenotest exposure.

EXAMPLE 10

A composition as in Example 9 with stereoregular poly-4-methylpentene-1 in place of isotactic polypropylene is used to prepare a film for exposure in the Xenotest apparatus. Embrittlement time in this case is 200 hours.

EXAMPLE 11

An organophosphorus compound possessing three UV-absorbing groups as the only substituents and having predominantly the structure

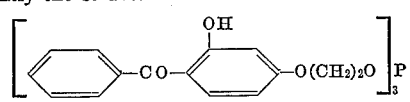

is prepared by refluxing together 2-hydroxy-4-hydroxyethoxybenzophenone (12.9 parts) phosphorus trichloride (2.3 parts) and benzene (45 parts) for 6 hours after which the solvent is removed by distillation and the residue heated at 170–180° C. for 1½ hours to produce on cooling a pale yellow oil which solidified on standing. Into isotactic polypropylene 0.5% by weight of this product together with 0.1% of the antioxidant used in Example 2 is incorporated and film and yarn prepared from the polymer composition as in Example 1.

Specimens of the yarn and film when exposed as in Example 1 retain 53% of the original yarn strength and embrittle in 610 hours.

EXAMPLE 12

An organophosphorus compound possessing one UV-absorbing group and two hindered phenol groups having predominantly the structure

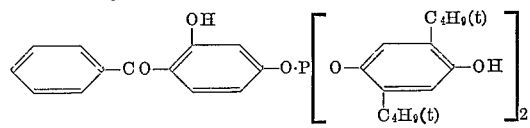

is prepared by first reacting together 2,4-di-hydroxybenzophenone (10.7 parts) and phosphorus trichloride (18.3 parts) at 65° C. with stirring for 6 hours and adding part (10.5 parts) of the product, which is the residue after removal of excess phosphorus trichloride, to a suspension of 2,5-di-t-butylhydroquinone (14.9 parts) in benzene (60 parts). Dry nitrogen gas is bubbled through the reaction mixture which is further processed as in Example 1 to produce a reddish-brown brittle solid 1.0% by weight of which is incorporated into isotactic polypropylene as the only stabilising substance. A film prepared from the polymer mixture when exposed in the Xenotest apparatus embrittles in 465 hours.

We claim:
1. Stabilised polyolefin compositions comprising polymers of alpha-olefins containing up to six carbon atoms having incorporated therein 0.2–2.0% by weight of a phosphorous acid derivative having the structure

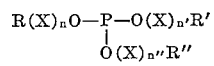

wherein R represents a 2-hydroxybenzophenone radical, R' and R" represent a member selected from the class consisting of aryl and alkyl groups having 6–14 carbon atoms, X represents a member selected from the group consisting of alkylene and alkyleneoxy groups having up to 20 carbon atoms and $n$, $n'$ and $n''$ are integers having the value 0–1.

2. A polyolefin composition according to claim 1 wherein there is also incorporated an antioxidant compound which is the condensation product of 3-methyl-6-tert-butyl phenol and crotonaldehyde in an amount sufficient to enhance the effectiveness of stabilisation.

3. A polyolefine composition according to claim 1 wherein the polyolefine is poly-4-methylpentene-1.

4. A polyolefine composition according to claim 1 wherein the polyolefine is polypropylene.

5. A polyolefine composition according to claim 2 wherein the polyolefine is stereoregular poly-4-methyl pentene-1.

6. A polyolefine composition according to claim 2 wherein the polyolefine is isotactic polypropylene.

7. A polyolefine composition according to claim 1 wherein the polyolefine is polyethylene.

8. A polyolefine composition according to claim 2 wherein the polyolefine is linear polyethylene.

References Cited

UNITED STATES PATENTS

| | | | |
|---|---|---|---|
| 3,181,971 | 4/1965 | Raymer | 260—49.95 |
| 3,389,099 | 6/1968 | Dressler et al. | 260—45.95 |
| 3,450,802 | 6/1969 | Taylor et al. | 260—45.95 |

HOSEA E. TAYLOR, JR., Primary Examiner

U.S. Cl. X.R.

260—946